United States Patent
Baxter

(10) Patent No.: US 10,805,666 B2
(45) Date of Patent: Oct. 13, 2020

(54) SYSTEMS AND METHODS FOR PROVIDING AN ENHANCED SHOPPING EXPERIENCE INCLUDING EXECUTABLE TRANSACTIONS AND CONTENT DELIVERY

(71) Applicant: Global Sports & Entertainment Marketing, LLC, St. George, UT (US)

(72) Inventor: Garrett Baxter, St. George, UT (US)

(73) Assignee: Global Sports & Entertainment Marketing, LLC, St. George, UT (US)

( * ) Notice: Subject to any disclaimer, the term of this patent is extended or adjusted under 35 U.S.C. 154(b) by 144 days.

(21) Appl. No.: 15/974,554

(22) Filed: May 8, 2018

(65) Prior Publication Data

US 2018/0322481 A1   Nov. 8, 2018

Related U.S. Application Data

(60) Provisional application No. 62/503,021, filed on May 8, 2017.

(51) Int. Cl.

| | | |
|---|---|---|
| H04N 21/40 | (2011.01) |
| H04N 21/431 | (2011.01) |
| G06Q 20/12 | (2012.01) |
| G06Q 30/06 | (2012.01) |
| H04N 21/478 | (2011.01) |
| H04N 21/254 | (2011.01) |
| H04N 21/81 | (2011.01) |
| G06F 3/0484 | (2013.01) |

(52) U.S. Cl.
CPC ........ *H04N 21/431* (2013.01); *G06Q 20/12* (2013.01); *G06Q 20/123* (2013.01); *G06Q 30/0641* (2013.01); *H04N 21/2542* (2013.01); *H04N 21/47815* (2013.01); *H04N 21/812* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 6,295,647 B1 * | 9/2001 | Ramaswamy | H04N 21/235 |
| | | | 725/116 |
| 9,344,754 B2 | 5/2016 | Briggs et al. | |
| 9,697,563 B2 | 7/2017 | Fitzpatrick | |
| 9,875,489 B2 | 1/2018 | Spitz et al. | |
| 2006/0178187 A1 | 8/2006 | Walker et al. | |
| 2007/0150360 A1 | 6/2007 | Getz | |

(Continued)

FOREIGN PATENT DOCUMENTS

WO    20140039592 A2    3/2014

OTHER PUBLICATIONS

"Mei, Tao, VideoSense—Towards Effective Online Video Advertising, Sep. 23-28, 2007, Microsoft Research Asia, pp. 1075-1084" (Year: 2007).*

(Continued)

*Primary Examiner* — William J Allen
*Assistant Examiner* — Maria P. Heath
(74) *Attorney, Agent, or Firm* — Knobbe, Martens, Olson & Bear, LLP

(57) ABSTRACT

Systems, methods and apparatus for providing, operating and conducting an application for facilitating transactions displayed with the display of content relating to the subject matter of the transactions.

17 Claims, 5 Drawing Sheets

(56) References Cited

U.S. PATENT DOCUMENTS

| | | |
|---|---|---|
| 2007/0243928 A1 | 10/2007 | Iddings |
| 2011/0162002 A1* | 6/2011 | Jones .............. H04N 21/42204 |
| | | 725/32 |
| 2014/0095330 A1* | 4/2014 | Briggs .............. G06Q 30/0251 |
| | | 705/14.73 |
| 2014/0270337 A1 | 9/2014 | Zhao et al. |
| 2015/0039468 A1 | 2/2015 | Spitz et al. |
| 2015/0074710 A1 | 3/2015 | Spitz et al. |
| 2016/0029070 A1 | 1/2016 | Briggs et al. |
| 2017/0013309 A1* | 1/2017 | Jallouli ............ H04N 21/44008 |
| 2017/0301003 A1 | 10/2017 | Spitz et al. |
| 2018/0063573 A1 | 3/2018 | Avedissian et al. |

OTHER PUBLICATIONS

International Search Report and Written Opinion, dated Feb. 5, 2019, PCT/US18/062680 to Baxter.

* cited by examiner

SYSTEMS AND METHODS FOR PROVIDING AN ENHANCED SHOPPING EXPERIENCE INCLUDING EXECUTABLE TRANSACTIONS AND CONTENT DELIVERY

CROSS-REFERENCE TO RELATED APPLICATIONS

This application claims the priority benefit of U.S. Provisional Patent Application No. 62/503,021 filed May 8, 2017, the disclosure of which is incorporated herein by reference.

BACKGROUND OF THE INVENTION

The invention generally relates to systems and methods of facilitating user interactivity in connection with the delivery of content, such as multimedia content, and in particular, enabling the execution of e-commerce transactions by viewing users simultaneously with the delivery of content for display on a user display device.

DESCRIPTION OF THE RELATED ART

Contextual advertising uses collected user activity data to provide advertisements based on content being searched and delivered to the user. The goal is ultimately to generate a transaction for the subject of the advertising. However, while advertisements based on user activity may be displayed before or even during content delivery, such as by banner ads, additional user action is required to find out more information about the subject of the advertisement. Additionally, such user action normally interferes with the continued delivery of content. For example, clicking on a banner ad on a web site redirects the user's browser to a different web site. Furthermore, user privacy is a topic of significant interest, with users desiring more privacy and less of their information being used to generate advertisements. Many users also apply countermeasures to prevent their activity from being monitored.

Accordingly, there is a need for a system and method of generating transactions more directly that avoids the inefficiencies and limitations noted above while facilitating e-commerce transactions without interfering with content delivery or redirecting users to other websites, among other things.

SUMMARY OF THE INVENTION

The invention is generally directed to systems and methods for generating transactions that is operatively associated with the delivery of content and can be used to execute an e-commerce transaction, such as the purchase of goods or services, coordinated with the delivery of content and without interruption thereof.

Some embodiments of the invention are directed to a transactional system, comprising: at least one processor; at least one input device; a display device, including a display screen; and at least one memory device that stores a plurality of instructions that, when executed by the at least one processor, cause the at least one processor to operate with the at least one display device and the plurality of input devices to: a) display content comprising playable media on a first portion of the display screen, wherein the playable media is associated with a duration of play; b) display one or more executable transactions for selection by a user through the one or more input devices on a second portion of the display screen, wherein each of the one or more executable transactions are associated with a preset time in the duration of play of the playable media and are displayed on the second portion of the display screen at the preset time during the display of the playable media on the first portion of the display screen; and c) responsive to the receipt of user interaction data from the one or more input devices, executing the one or more executable transactions displayed on the second portion of the display screen.

In some embodiments, the preset time in the duration of play of the playable media at which each of the one or more executable transactions is displayed is previously assigned by associating a unique identifier corresponding to the executable transaction with the playable media and storing the playable media with associated unique identifiers in the memory device.

In some embodiments, the display device is a smartphone or an electronic gaming machine.

In some embodiments, the executable transactions for selections are displayed in order of appearance in the second portion of the display screen. The playable media may be any content, including pictures, audio, video, image display or combinations thereof.

Some embodiments of the invention are directed to a transactional system, comprising: at least one processor; at least one input device; a display device, including a display screen; and at least one memory device that stores a plurality of instructions that, when executed by the at least one processor, cause the at least one processor to operate with the at least one display device and the plurality of input devices to: receive content comprising playable media; display the playable media on a first portion of the display screen, wherein the playable media is associated with a duration of play; receive information relating to one or more executable transactions for selection by a user, the one or more executable transactions being displayed on the display screen; receive an association data for each executable transaction, the association data including a timing for display of an executable transaction during the duration of play of the playable media through a second portion of a display screen; store the playable media with associated executable transactions; play the playable media in the first portion of the display screen, wherein the associated executable transactions are displayed in a second portion of the display screen; and responsive to the receipt of user interaction data from the one or more input devices, executing the one or more executable transactions displayed on the second portion of the display screen.

In some embodiments, the timing for display of an executable transaction further includes an end time during the duration of play. In some embodiments, the executable transactions are displayed as selectable items in the second portion of the display screen during the duration of play. A transaction will be completed and fulfilled responsive to selecting the item. The executable transaction may be associated with the playable media by graphically selecting an image representing the executable transaction to be displayed on a timeline associated with the duration of play for the playable media.

Some embodiments of the invention are directed to a method comprising the steps of: displaying content comprising playable media on a first portion of the display screen, wherein the playable media is associated with a duration of play; displaying one or more executable transactions for selection by a user through the one or more input devices on a second portion of the display screen, wherein each of the one or more executable transactions are associated with a preset time in the duration of play of the playable media and are displayed on the second portion of the display screen at the preset time during the display of the playable media on the first portion of the display screen; and responsive to the receipt of user interaction data from the one or more input devices, executing the one or more executable transactions displayed on the second portion of the display screen.

Some embodiments of the invention are directed to a method comprising the steps of: receiving content comprising playable media; displaying the playable media on a first portion of the display screen, wherein the playable media is associated with a duration of play; receiving information relating to one or more executable transactions for selection by a user, the one or more executable transactions being displayed on the display screen; receiving an association data for each executable transaction, the association data including a timing for display of an executable transaction during the duration of play of the playable media through a second portion of a display screen; storing the playable media with associated executable transactions; playing the playable media in the first portion of the display screen, wherein the associated executable transactions are displayed in a second portion of the display screen; and responsive to the receipt of user interaction data from the one or more input devices, executing the one or more executable transactions displayed on the second portion of the display screen.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF THE INVENTION

Figure 1:
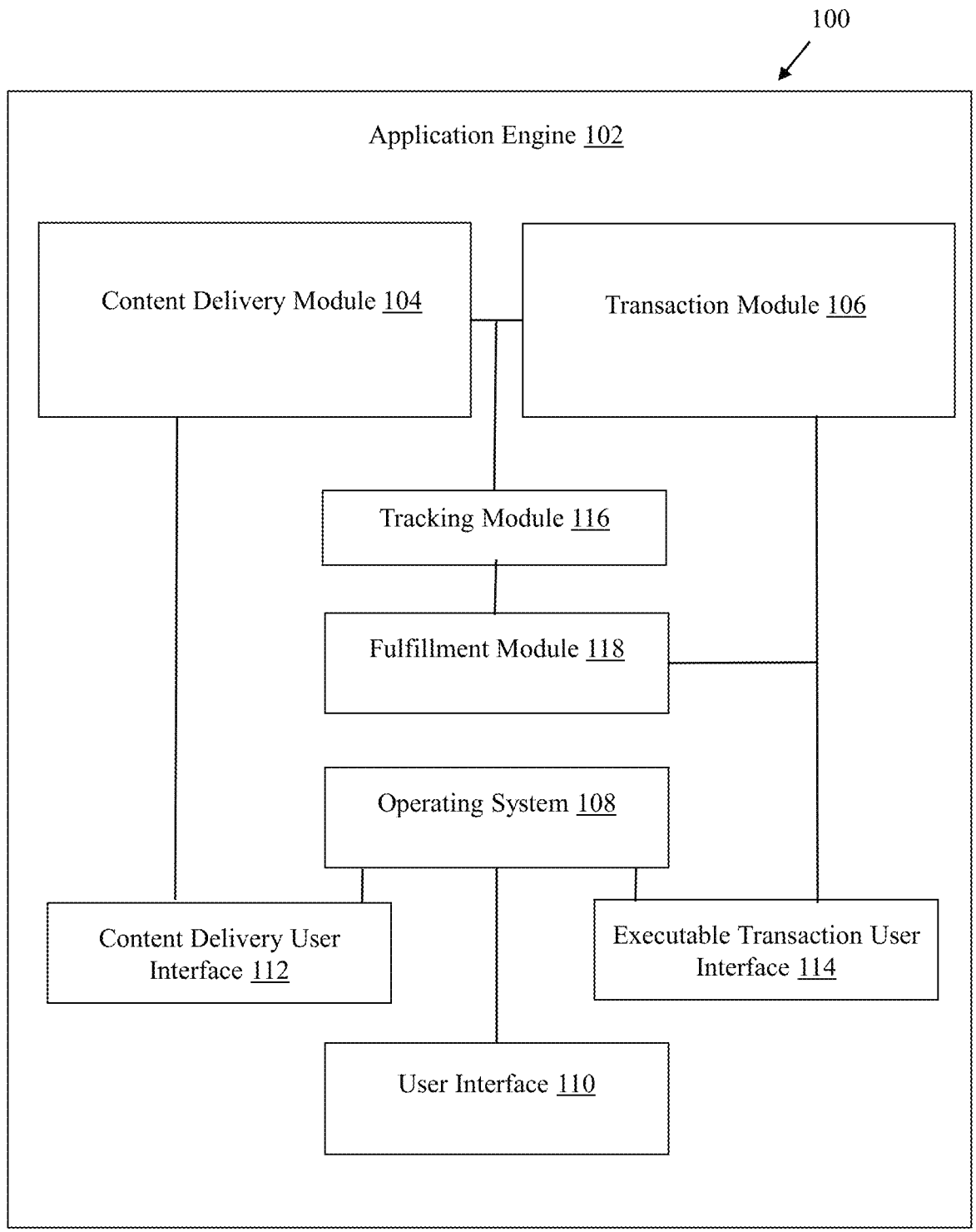
FIG. 1 is a conceptual diagram illustrating components of a system constructed and configured in accordance with some embodiments of the invention.

The following detailed description provides systems and methods for implementing features of the invention in various content delivery applications. The applications may be implemented in accordance or in conjunction with one or more of a variety of different types of software and hardware systems, such as those described herein, including devices which may be specially configured for the provision of such applications, such as televisions and electronic gaming machines, and devices which are not specially configured for the provision of such applications but which can be enabled as a platform through which such features of the invention can be made accessible, such as a smartphone or personal computer. Embodiments of the invention therefore contemplate a variety of different devices, and any style or type of display, including virtual reality, augmented reality and holographic displays, and as such, embodiments of the invention include devices that may include and be implemented with special features and/or additional circuitry that differentiates them from general-purpose computers (e.g., desktop PC's and laptops).

Accordingly, the term "transactional system" as used herein may refer to a group of any one or more devices and/or one or more devices which are not specially configured for the provision of applications of the invention, along with one or more central servers, central controllers, or remote hosts, and data networks as needed. A transactional system may more particularly include at least one processor and memory or data storage device storing program code and instructions executable by the at least one processor to control the content delivery application of the invention. The term "content" as used herein refers to any form of media, such as images, audio or video, virtual reality, augmented reality and holographic images, or any combination thereof, which is viewable, playable or displayable by the transactional system.

In some embodiments, part or all of the program code and/or the operating data is downloaded to the at least one memory of a device through any suitable data network described above (such as an internet or intranet).

In various embodiments, the transactional system includes one or more input devices. The input devices may include any suitable device that enable an input signal to be produced and received by the at least one processor of the system. One input device of the transactional system may be a device or application configured to communicate with the at least one processor of the transactional system to indicate a selection by a user, such as a data input device. In certain embodiments, the input device includes a payment device such as a bill acceptor into which paper money is inserted, a ticket acceptor into which a ticket or a voucher is inserted, a reader or a validator for credit cards, debit cards, or credit slips into which a credit card, debit card, or credit slip is inserted. In some embodiments, the transactional system includes a payment application configured to receive funds via an electronic funds transfer, such as a transfer of funds from a bank account, or other account configured for electronically transferring funds from a bank account, or through accepting of cryptocurrency from an exchange thereof.

FIG. 1 illustrates an exemplary architecture of a transactional system 100 which generally includes an application engine 102 in communication with a content delivery module 104 and a transaction module 106. Application engine 102 manages the overall operation of the transactional system 100 and therefore includes the hardware and/or software as discussed herein to provide the particular application of the invention. Application engine 102 further includes an operating system 108 that controls and enables the display of a user interface 110 on display devices, such as a user's smartphone or PC display for example. Content delivery module 104 manages and enables the delivery of content from a content source, such as a live streaming media broadcast, local memory or a remote memory or database, through a content delivery interface 112. Transaction module 106 manages and enables user executable transactions for display to users through an executable transaction user interface 114.

In some embodiments, transaction user interface 114 and content delivery interface 112 are provided simultaneously on user interface 110. In some embodiments, executable transactions displayed through user interface 114 are presented for display at the same time and in connection with the display of specific parts of the content delivered for display on interface 112 by content delivery module 104. In some embodiments, user interface 114 is only displayed on interface 110 responsive to an executable transaction being displayed in coordination with the display of related content through interface 112. For example, if the content displayed through interface 112 is a movie and an executable transaction for display relates to sunglasses worn by an actor in the movie, then interface 114 may appear and display an executable transaction on interface 110 to purchase the sunglasses responsive to the display of a scene in which the sunglasses are worn, and may only be displayed for a preset, limited duration shown by a displayed countdown timer. System 100 enables the purchase to be completed without redirection or interference with content displayed through interface 112.

Application engine 102 additionally monitors and stores user interaction data via interaction tracking module 116 which is coupled with memory and enabled for exchanging information with a centralized server. Interaction data may include various audit logs and activity information for users, such as any information received through user interfaces 112 and 114 regarding executable transactions having been executed via transaction module 106 or additional content to be delivered by content delivery module 104. Fulfillment module 118 also has access to the interaction data in tracking module 116 and is in communication with transaction module 106 for purposes of identifying executed transactions and displaying through interface 110 additional information relating to the executed transactions.

For example, in an application of system 100 in which content delivery module 104 provides the display of content on interface 112 relating to an event occurring at an entertainment venue, transaction module 106 may provide on interface 114 executable transactions relating to the scheduling of a limo service, a reservation for dinner at a restaurant at the venue and tickets for the event. The executable transactions may be timed or otherwise coordinated for display on interface 114 during the display of associated content displayed on interface 112. Thus, a user may see on interface 110 the simultaneous display of content and an executable transaction relating to the content being displayed. The user may use an input device of system 100 to selectively execute an executable transaction displayed on interface 114. This selection which will be recorded by tracking module 116 for follow up and completion through fulfillment module 118. Fulfillment module 118 may be in further communication with payment or fund transfer systems, such as the Account Clearing House (ACH) Network, Paypal or credit card payment systems. It should be understood that an executable transaction may also include interactions relating to the content which do not involve payment or transfer of funds, such as the submittal by a user of feedback or an opinion relating to the content.

It should be understood that each engine and module discussed herein may include additional modules and engines depending on the embodiment of the invention. In accordance with some of these embodiments, fulfillment module 118 may have access to a user profile or other information that enables transactions to be executed most efficiently, without redirecting users or interfering with content delivery on interface 112, and which enables suggestions or advertisements to be displayed through user interface 110 relating to the delivery of additional content of possible interest to the user available through content module 104.

Module 104 may have access to a wide variety of content for delivery, and may be searchable, such that a user can access user interface 110 to find prerecorded advertisements, shows, movies, infomercials, as well as access broadcast media, such as cable or satellite television programming, all of which will be made available by application engine 102 for display on a user's device through interface 112 while module 106 coordinates the display of one or more executable transactions through interface 114 with associated content being displayed through interface 112. It should be understood that the display of an executable transaction may also be unrelated to the content displayed by module 104, such as an executable transaction for a complimentary drink at a casino made through an electronic gaming machine while playing a slot game.

Figure 2:
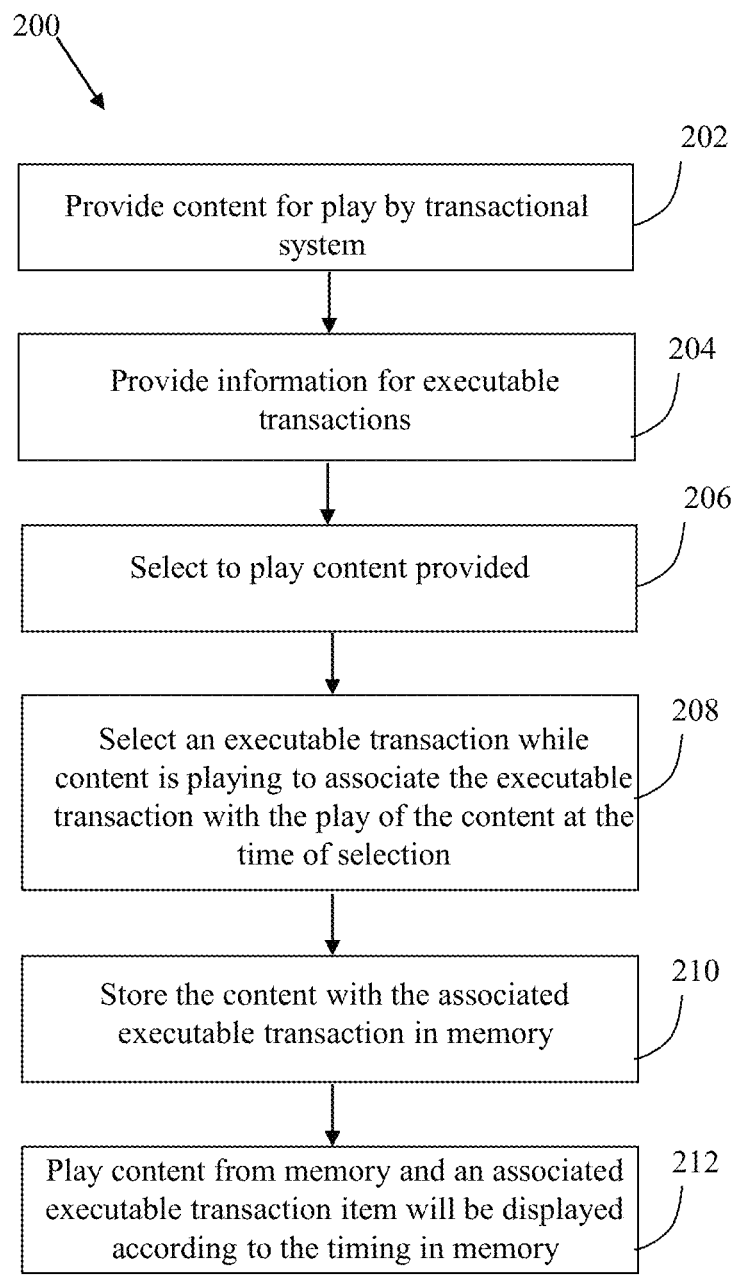
FIG. 2 is a flowchart illustrating a method of enabling the operation of an exemplary embodiment of the system of the invention.

FIG. 2 illustrates a flowchart of an exemplary embodiment of a process or method 200 of operating or using the transactional system of the invention, which may be represented by a set of instructions stored in one or more memories and executed by one or more processors. For purposes of illustration, the interfaces 112 and 114 will be discussed as being provided to facilitate the set-up or "back-end" of a system 100 and method 200 of the invention. It should be understood that a content provider using system 100 will be required to have registered and thereafter login to an account in order to access some or all of the features described herein.

As shown by block 202, a content provider uploads or otherwise make available content to a content delivery module 104 of transactional system 100. As shown by block 204, the content provider may upload or otherwise enter in the details of an executable transaction for use by module 106. The details may include any relevant information, such as a description of a good for purchase and the purchase price and other information. As shown by block 206, in this embodiment the content provider selects to play the content on interface 112 by module 104. In block 208, the content provider selects the timing for display of the executable transaction on interface 114 by module 106 by selecting or clicking on an area displayed on interface 114 which represents the executable transaction. A default setting may be that all executable transactions are displayed at the beginning of the content playback if clicked on without playing the content. The executable transaction may be selected for display one or more times during the display of content on interface 112 by clicking on the item in interface 114 during content playback in interface 112. The duration of the display of executable transactions on interface 114 may also be selected, preset or remain displayed. In some embodiments, an executable transaction may be displayed until a subsequent executable transaction item is displayed, upon which the first transactional item may no longer be displayed or may be displayed as if moved to a lower position in a list of transactional items in interface 114.

All of the aforementioned activity, that is, clicking on the executable transaction displayed in interface 114 while content plays in interface 112 is stored in memory as shown by block 210, thus enabling the executable transaction to be displayed at the selected specific time during playback of the content thereafter for users of system 100. In some embodiments, a unique identifier is assigned to the executable transaction item and stored with the provided content by system 100, along with other relevant information such as such as a sku number and the duration of display of the executable transaction item during content playback. Thus, as shown in block 212, playback of the content through interface 112 by module 104 will include the display of executable transactions in interface 114 at the timing selected by the content provider, pursuant to the method 200 as described herein.

Upon displaying the content to a user, which may be user actuated or presented to a user automatically, such as an advertisement played while watching an online program, the user will be able to view the content through interface 112 and the executable transaction through interface 114 at the timing selected by the content provider through a user device, such as a PC, television, tablet or smartphone. Should the user have an interest in executing the transaction, the user can select or click on the executable transaction item in interface 114 and the transaction may be fully executed thereafter through fulfillment module 118, without either redirecting the user to another location, application, website to complete the transaction or otherwise interfering with, stopping or delaying content delivery in interface 112. In some embodiments, fulfillment module 118 waits until after playback to finalize execution of the transaction. In other embodiments, fulfillment module 118 executes the transaction during the content playback or halts playback to finalize execution of the transaction.

System 100 may also be configured to automatically review the content and create executable transactions for display to a user in coordination with the display of associated items or parts of the content. For example, the automated processing may entail the processor of system 100 detecting and matching the display of goods in the content with the goods involved in the transactional items, and thereafter tagging the content at the corresponding time to display the transactional item. In other embodiments, the content may be pre-tagged upon being provided by the content provider along with the content provider providing a list of transactional items associated with the tagged content.

Figure 3:
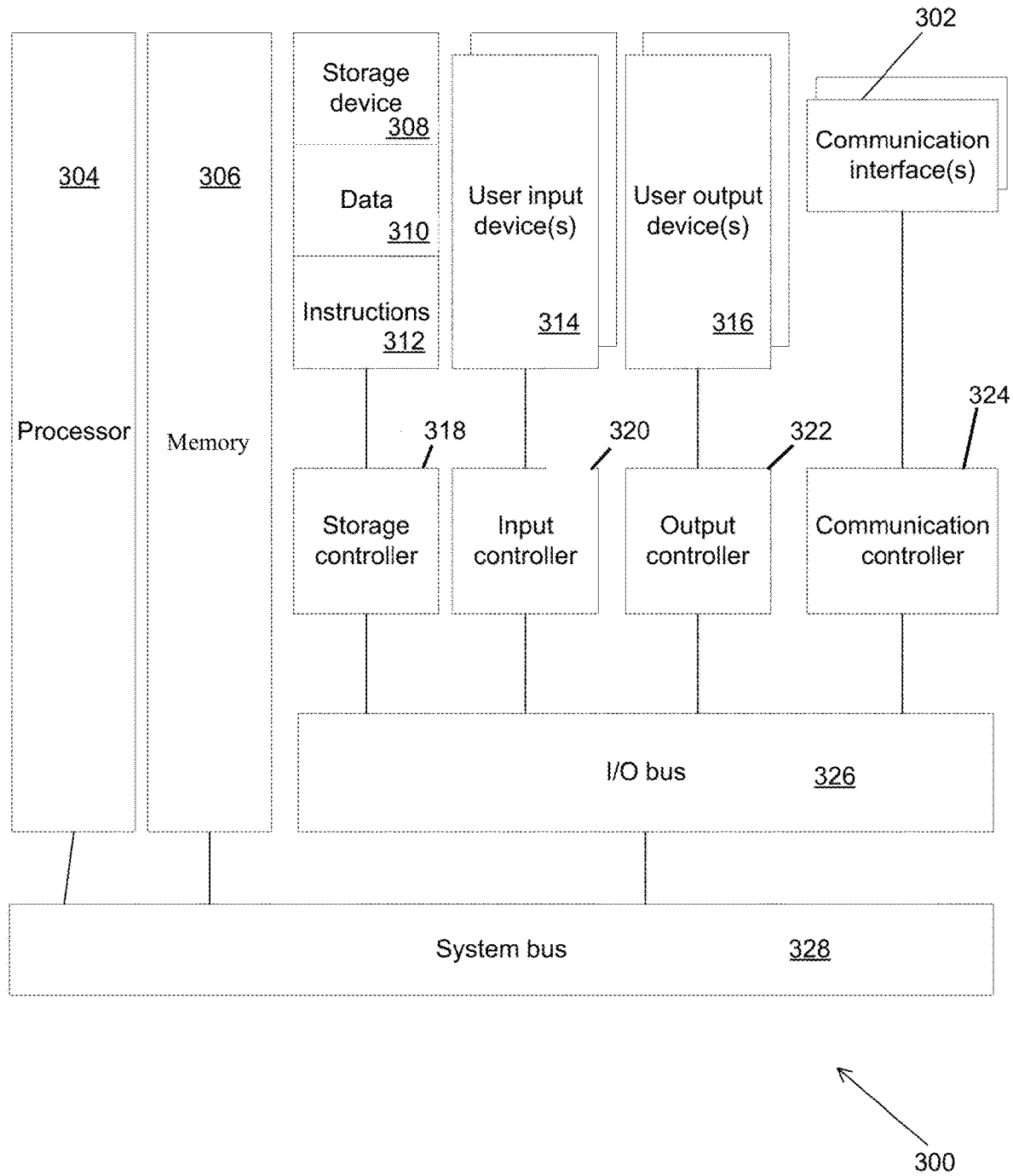
FIG. 3 illustrates a block diagram of components of a system capable of providing various features of some embodiments of the invention.

Any of a variety of processing apparatuses or systems can host various components of a transactional system of the invention. In accordance with embodiments of the invention, these transactional systems can include, but are not limited to, mobile devices such as a smartphone, personal digital assistant or the like, a wireless device such as a tablet computer or the like, an electronic gaming terminal, a general purpose computer, a computing device and/or a controller. An exemplary, non-limiting transactional system capable of implementing a content delivery application in accordance with embodiments of the invention is illustrated in FIG. 3. In system 300, a processing device or processor 304 is coupled to a memory 306 by a bus 328. The processor 304 is also coupled to processor-readable storage media, such as a storage device 308 that stores processor-executable instructions 312 and data 310 through the system bus 328 to an I/O bus 326 through a storage controller 318. The processor 304 is also coupled to one or more interfaces that can be used to connect the processor to other processing apparatuses, such as a transactional system for providing content delivery and executable transaction fulfillment processing for example, as well as networks as described herein. The processor 304 is also coupled via the bus to user input devices 314, such as tactile devices including, but not limited to, keyboards, keypads, touch screens; as well as non-contact devices such as audio input devices, motion sensors and motion capture devices that the transactional system of the invention can use to receive inputs from a user when the user interacts with the transactional system and selects content or creates interaction data by selecting an executable transaction for execution by system 300. The processor 304 is connected to these user input devices 314 through the system bus 328, to the I/O bus 326 and through the input controller 320. The processor 304 is also coupled via the bus to user output devices 316 such as (but not limited to) visual output devices, audio output devices, and/or tactile output devices that the system uses to generate outputs perceivable by the user when the user interacts with the content delivery application, including devices capable of displaying virtual reality, augmented reality or holographic images. In accordance with some embodiments, the processor is coupled to visual output devices such as (but not limited to) display screens. In accordance with particular embodiments, the processor is coupled to audio output devices such as (but not limited to) speakers, and/or sound amplifiers. The processor 304 is connected to output devices from the system bus 328 to the I/O bus 326 and through the output controller 322. The processor 304 can also be connected to a communications interface 302 from the system bus 328 to the I/O bus 326 through a communications controller 324.

In accordance with various embodiments, a processor 304 can load instructions, algorithms and data from the storage device into the memory 306. The processor 304 can also execute instructions that operate on the data to implement various aspects and features of the components of a content delivery application as discussed above. The processor 304 can utilize various input and output devices in accordance with the instructions and the data in order to create and operate user interfaces for users and content providers in accordance with the invention.

Although system 300 is described herein as being constructed with a processor and instructions stored and executed by hardware components, the system can be composed of only hardware components in accordance with other embodiments. In addition, although the storage device is described as being coupled to the processor through a bus, those skilled in the art will understand that the storage device can include removable media such as, but not limited to, a USB memory device, an optical CD ROM, magnetic media such as tape and disks. Also, the storage device containing software can be accessed by processor 304 through one of the interfaces or over a network. Furthermore, any of the user input devices or user output devices can be coupled to the processor 304 via one of the interfaces or over a network. In addition, although a single processor 304 is described, those skilled in the art will understand that the processor 304 can be a controller or other computing device or a separate computer as well as be composed of multiple processors or computing devices including one or more processors.

Figure 4:
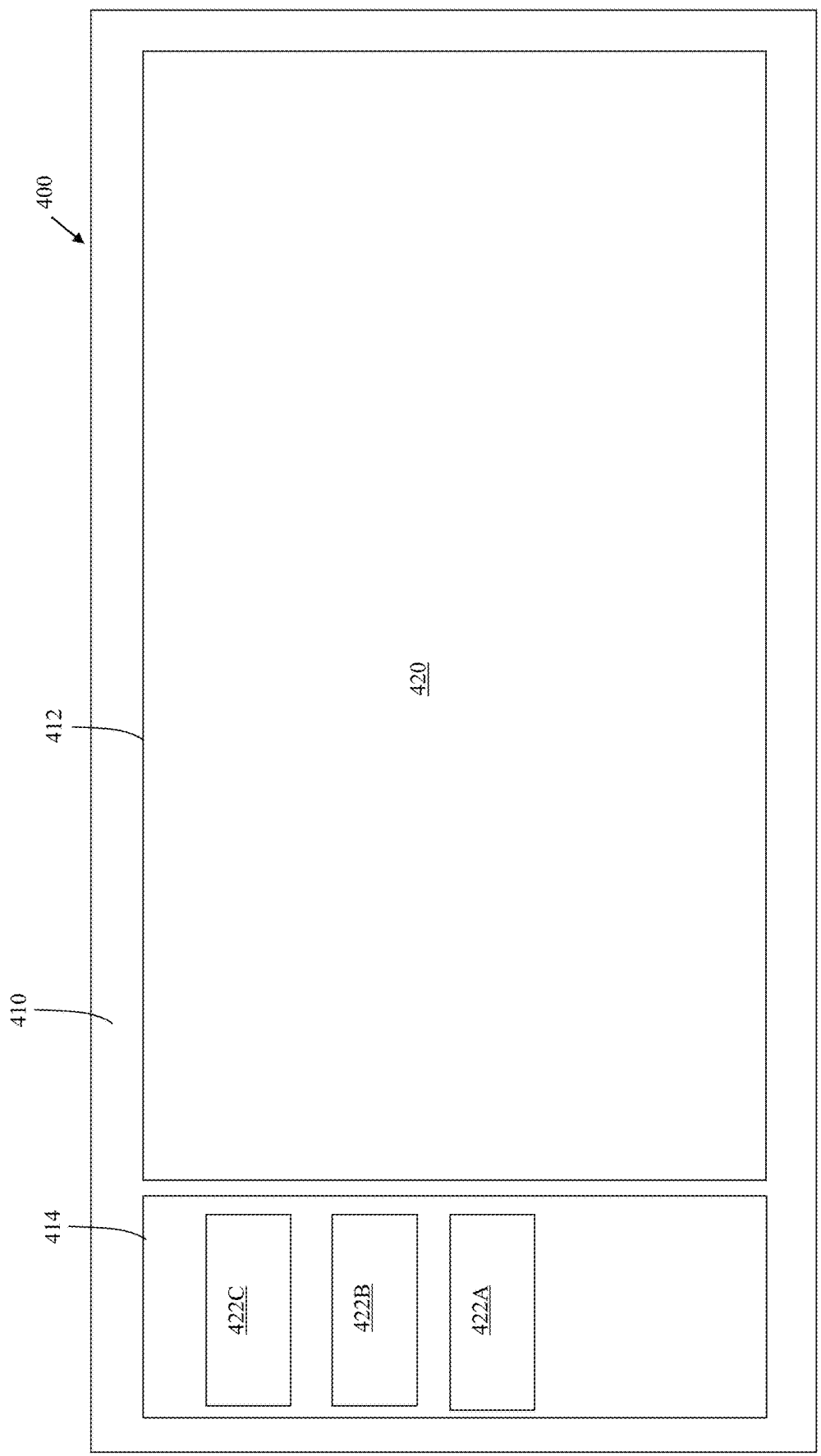
FIGS. 4-5 provide exemplary user interfaces which may be displayed to users and content providers illustrating various features of some embodiments of the invention.

FIG. 4 illustrates an exemplary screen on a user device generally referred to as display 400 on which a user interface 410 is displayed by a transactional system of the invention. It should be understood that access to user interface 410 may be obtained through various means, depending on the embodiment and user device. For example, user interface 410 may be provided through a website provided on the Internet, through broadcast, satellite or cable transmissions, a mobile application, or provided at a standalone computerized platform such as a kiosk or electronic gaming machine. Interface 410 includes content 420, such as a video, which is viewable through interface area 412.

While content 420 plays in interface area 412, executable transactions displayed as items 422A, 422B and 422C are displayed in interface area 414 of user interface 410. Each item 422A, 422B and 422C represents a transaction for a good or service that may be executed responsive to the user selecting the respective item, such as by clicking on the item or touching the display 400 in the area the item is displayed. Each item 422A, 422B and 422C may contain a description or images relating to the good or service. Selecting an item enables the execution of a transaction relating to the good or service represented by the item.

For example, if the content 420 is a promotional video for a live show at a casino, then item 422A may displayed in interface 414 enabling a purchase of tickets to the show responsive to being selected by the user. As content 420 continues to be played, the advertisement may mention the location of the show, and item 422B which can be selected to reserve a hotel room at the casino is displayed in interface 414. Content 420 may also describe the casino amenities and item 422C may appear in interface 414 which can be selected to join a player loyalty club offered by the casino. In some embodiments, each successively appearing item is displayed above the prior item displayed in interface 414.

In another example, the content 420 is a commercial for a retail store, wherein each item 422A, 422B and 422C relates to goods and services available through the store that may be purchased by selection of the corresponding item. The timing of selecting the item after display in interface 414 may be tracked by the transactional system of the invention for purposes of awarding or offering a discount or some other benefit to encourage timely execution of the transaction for the good or service.

In yet another example, the content 420 is a streaming video, such as music video or other online programming wherein each item 422A, 422B and 422C relates to goods that are placed in video or programming, such as sunglasses, clothes or jewelry worn by a model or actor in a music video, or a CD or download of the music playing in the video.

In some embodiments, interface 414 is displayed on user interface 410 as items 422A, 422B and 422C are displayed during play of content 420. In some embodiments, interface 414 is displayed throughout play of content 420.

In some embodiments, interface 414 overlaps with interface 412, such that 422A, 422B and 422C are displayed over content 420 as it is played. Items 422A, 422B and 422C may be displayed in the foreground of content 420 as partially or fully transparent images to permit viewing of content 420 in the background, while being visible to the user for purposes of selecting an item.

Figure 5:
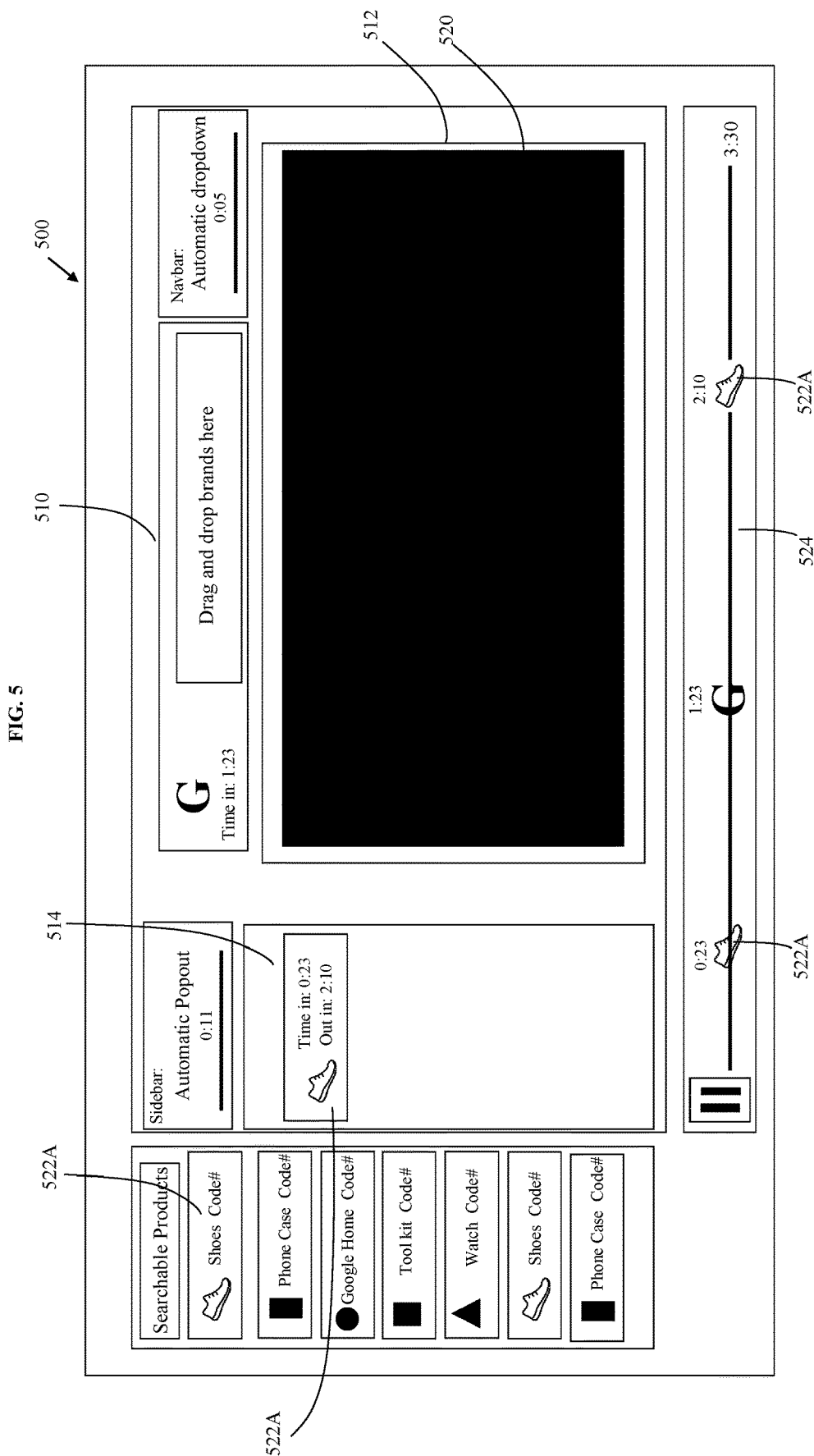

FIG. 5 illustrates an exemplary content provider interface 510 for creating transaction-ready content, including associating executable transactions that are displayed during the display of a video. The content provider may be provided information relating to executable transactions 522, each of which is associated with a unique identifier. Each executable transaction may further include an image of the good involved to facilitate the association process. For example, executable transaction item 522A includes the image of a sneaker because item 522A enables the purchase of sneakers during play of video 520 in interface 512. Item 522A may be "dragged and dropped" from executable transactions 522 onto the video play time bar 524, which results in the image representing item 522A appearing in interface 514. The start time during the video 520 in which item 522A is also displayed in interface 514, which corresponds with the location on the time bar 524 in which item 522A was "dropped."

As shown in FIG. 5, item 522A will be displayed in interface 514 starting at the point at which 0:23 of the video 520 has played and it will no longer be displayed at the at the point at which 2:23 of the video 520 has played. The start time and end time of the display of item 522A is also shown on the time bar 524 by the appearance of item 522A or the image representing item 522A, at 0:23 and 2:23 of the content 520 play time. Each of the executable transactions 522 may be similarly dragged and dropped onto bar 524 to create corresponding executable transaction items for display simultaneously in interface 514 during play of content 520 when accessed by a user of the transactional system. Alternatively, transactions 522 may be added as items during the play of content 520 by selection, such as by clicking on an "add" button, rather than being dragged and dropped, which would result in an item 522A being associated with content 520 at the time the selection is made. Similarly, items may be removed from association with content 520 by selection or moving the item image from bar 524.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/ programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Additional information regarding exemplary embodiments of the invention is provided below.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, Node, React, Redux or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing system or device. Systems of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as users, content providers and operators thereof are provided with useful access thereto, either through a mobile device, system, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A system comprising:
    at least one processor; and
    at least one memory device that stores a plurality of instructions that, when executed by the at least one processor, cause the at least one processor to:
        present an interface to a content provider that enables the content provider to associate each of a plurality of good or services with a different point in time within video content associated with the content provider, wherein the interface enables the content provider to associate a first good or service with a first point in time within the video content by dragging a first item displayed within the interface to a first position on a time bar displayed within the interface;
        based at least in part on an indication that the content provider has dragged the first item to the first position on the time bar:
            update display of the interface to include visual indicators for the first good or service that indicate a start time and end time on the time bar, wherein the start time and end time represent a time range during playback of the video content at which an executable transaction will be presented for purchasing the first good or service; and
            store executable transaction data associating the start time and end time with the first good or service;
        cause display of the video content on a first portion of a display screen, wherein the video content is associated with a duration of play;
        cause display of one or more selectable items for selection by a user via one or more input devices on a second portion of the display screen, wherein each of the one or more selectable items represents a different executable transaction of one or more executable transactions for purchasing one or more goods or services previously associated with the video content, wherein each of the one or more executable transactions are associated with a preset time in the duration of play of the video content and are displayed on the second portion of the display screen at the preset time during the display of the video content on the first portion of the display screen, wherein the one or more selectable items include a first selectable item representing a first executable transaction for purchasing the first good or service, wherein the first selectable item is displayed beginning at the start time during display of the video content;
        receive indication of user interaction data associated with the one or more input devices, wherein the user interaction data indicates user selection of the first selectable item displayed on the second portion of the display screen during playback of the video content, wherein the user selection does not redirect the user from the video content and does not stop playback of the video content; and
        responsive to receipt of the indication of the user interaction data and while the video content continues to play and be displayed in the first portion of the display screen, execute the first executable transaction associated with the first selectable item displayed on the second portion of the display screen, wherein the executing the first executable transaction comprises initiating purchase by the user of the first good or service associated with the first selectable item, wherein the purchase is initiated without redirecting the user from the video content and without stopping playback of the video content.

2. The system of claim 1, wherein the preset time in the duration of play of the video content at which each of the one or more selectable items is displayed is previously assigned by associating a unique identifier corresponding to a corresponding executable transaction with the video content and storing the video content with associated unique identifiers in the memory device.

3. The system of claim 1, wherein the video content and one or more selectable items are displayed on a smartphone.

4. The system of claim 1, wherein the video content and one or more selectable items are displayed on an electronic gaming machine.

5. The system of claim 1, wherein two or more selectable items are displayed in order of appearance in the second portion of the display screen, such that each successively displayed selectable item appears above a previously displayed selectable item.

6. The system of claim 1, wherein each of the one or more executable transactions are further associated with an end time during the duration of play wherein the end time represents a time during playback of the video content at which a corresponding executable transaction is no longer available for user selection.

7. The system of claim 1, wherein the content provider dragging the first item includes the content provider graphically selecting an image representing the executable transaction.

8. The system of claim 1, wherein the second portion of the display screen overlaps the first portion of the display screen, such that the one or more selectable items are displayed over the video content.

9. The system of claim 8, wherein the one or more selectable items appear as partially transparent over the video content.

10. The system of claim 1, wherein the video content is displayed in at least one of an application or a website presented on a user device, and wherein initiating the purchase without redirecting the user from the video content comprises fully executing a purchase transaction without redirecting the user device from the application or the website to any other application or other website.

11. The system of claim 1, wherein causing display of the one or more selectable items comprises causing display of at least one of an image or a description of a good or service.

12. The system of claim 1, wherein the plurality of instructions further cause the at least one processor to cause display of a countdown timer for the first selectable item indicating a limited preset duration within the video content during which the first executable transaction is available to be executed.

13. A computer-implemented method comprising:
presenting an interface to a content provider that enables the content provider to associate each of a plurality of good or services with a different point in time within video content associated with the content provider, wherein the interface enables the content provider to associate a first good or service with a first point in time within the video content by dragging a first item displayed within the interface to a first position on a time bar displayed within the interface;
based at least in part on an indication that the content provider has dragged the first item to the first position on the time bar:
    updating display of the interface to include visual indicators for the first good or service that indicate a start time and end time on the time bar, wherein the start time and end time represent a time range during playback of the video content at which an executable transaction will be presented for purchasing the first good or service; and
    storing executable transaction data associating the start time and end time with the first good or service;
causing display of the video content on a display screen, wherein the video content is associated with a duration of play;
causing display on the display screen of one or more selectable items for selection by a user, wherein the one or more selectable items appear over a portion of the video content during playback of a subset of the duration of play of the video content, wherein each of the one or more selectable items represents a different executable transaction of one or more executable transactions for purchasing one or more goods or services previously associated with the video content, wherein each of the one or more executable transactions are associated with a preset time in the duration of play of the video content and are displayed at the preset time during the display of the video content, wherein the one or more selectable items include a first selectable item representing a first executable transaction for purchasing the first good or service, wherein the first selectable item is displayed beginning at the start time during display of the video content;
receiving indication of a user selection of the first selectable item displayed on the display screen during playback of the video content, wherein the user selection does not redirect the user from the video content and does not stop playback of the video content; and
responsive to receipt of the indication of the user selection and while the video content continues to play and be displayed on the display screen, executing the first executable transaction associated with the first selectable item, wherein the executing the first executable transaction comprises initiating purchase by the user of the first good or service associated with the first selectable item, wherein the purchase is initiated without redirecting the user from the video content and without stopping playback of the video content.

14. The computer-implemented method of claim 13, wherein the one or more selectable items appear as partially transparent over the video content.

15. The computer-implemented method of claim 13, wherein the video content is displayed in at least one of an application or a website presented on a user device, and wherein initiating the purchase without redirecting the user from the video content comprises fully executing a purchase transaction without redirecting the user device from the application or the website to any other application or other website.

16. The computer-implemented method of claim 13, wherein causing display of the one or more selectable items comprises causing display of at least one of an image or a description of a good or service.

17. The computer-implemented method of claim 13 further comprising causing display of a countdown timer for the first selectable item indicating a limited preset duration within the video content during which the first executable transaction is available to be executed.

* * * * *